(12) United States Patent
Paalasmaa et al.

(10) Patent No.: US 8,131,272 B2
(45) Date of Patent: Mar. 6, 2012

(54) SYSTEM AND METHOD FOR GENERATING A LIST OF DEVICES IN PHYSICAL PROXIMITY OF A TERMINAL

(75) Inventors: Joonas Paalasmaa, Helsinki (FI); Antti Sorvari, Itaesalmi (FI); Jukka-Pekka Salmenkaita, Esposo (FI)

(73) Assignee: Nokia Corporation, Espoo (FI)

( * ) Notice: Subject to any disclaimer, the term of this patent is extended or adjusted under 35 U.S.C. 154(b) by 382 days.

(21) Appl. No.: 12/036,995

(22) Filed: Feb. 25, 2008

(65) Prior Publication Data

US 2008/0147798 A1 Jun. 19, 2008

Related U.S. Application Data

(63) Continuation of application No. 11/173,292, filed on Jun. 30, 2005, now Pat. No. 7,336,928.

(30) Foreign Application Priority Data

Jun. 30, 2004 (WO) .................. PCT/IB2004/002166

(51) Int. Cl.
*H04M 3/42* (2006.01)
(52) U.S. Cl. ...................... 455/414.1; 455/456; 455/567
(58) Field of Classification Search .................. 455/456, 455/567; 707/1
See application file for complete search history.

(56) References Cited

U.S. PATENT DOCUMENTS

| | | | |
|---|---|---|---|
| 2002/0164995 A1* | 11/2002 | Brown et al. ................. | 455/456 |
| 2003/0103144 A1 | 6/2003 | Sesek et al. | |
| 2004/0044774 A1 | 3/2004 | Mangalik et al. | |
| 2004/0122810 A1 | 6/2004 | Mayer | |
| 2004/0133547 A1* | 7/2004 | Doi .................................. | 707/1 |
| 2005/0188399 A1 | 8/2005 | Tischer | |
| 2005/0250552 A1* | 11/2005 | Eagle et al. .................... | 455/567 |
| 2006/0021025 A1 | 1/2006 | Okamoto et al. | |
| 2006/0085823 A1 | 4/2006 | Bell et al. | |
| 2007/0172066 A1 | 7/2007 | Davin | |

FOREIGN PATENT DOCUMENTS

| | | |
|---|---|---|
| CN | 1447943 A | 10/2003 |
| WO | WO 01/98856 A2 | 12/2001 |

OTHER PUBLICATIONS

International Search Report and Written Opinion for International Application No. PCT/IB2004/002166 dated Oct. 14, 2004.
International Preliminary Examination Report for International Application No. PCT/IB2004/002166 dated Aug. 16, 2006.
Office Action for Chinese Application No. 2004800435135 dated Sep. 18, 2009.
Office Action for Chinese Application No. 2004800435135 dated Jun. 7, 2010.
Office Action for Chinese Application No. 200480043513.5 dated Nov. 28, 2011.

* cited by examiner

*Primary Examiner* — David Q Nguyen
(74) *Attorney, Agent, or Firm* — Alston & Bird LLP

(57) ABSTRACT

This invention relates to generating a list of devices in physical proximity of each other and utilizing said list, for example, for sharing of content between a plurality of mobile devices applying individual media items such as address book entries, calendar entries, and/or Short Messaging Services (SMS) or Multimedia Messaging Services (MMS) messages.

32 Claims, 3 Drawing Sheets

SYSTEM AND METHOD FOR GENERATING A LIST OF DEVICES IN PHYSICAL PROXIMITY OF A TERMINAL

FIELD OF INVENTION

This invention relates to communication between mobile devices such as mobile or cellular telephones and/or personal digital assistants (PDAs). In particular, this invention relates to generating a list of devices in physical proximity of each other and utilizing said list, for example, for sharing of content between a plurality of mobile devices applying individual media items such as address book entries, calendar entries, and/or Short Messaging Services (SMS) or Multimedia Messaging Services (MMS) messages.

BACKGROUND OF THE INVENTION

Lately, mobile devices have evolved to perform, in addition to voice communication, storing, generation and transmission of text messages such as SMS messages as well as storing, generation and transmission of MMS messages comprising a video, picture or audio sequence. Furthermore, mobile devices have evolved to include PDA features such as calendar, address book, and even computer features such as email functions. Consequently, mobile devices must be able to handle a larger amount of personal content and/or media collections.

Software applications for managing media collections in personal computers have become widely adopted as the number of media items has increased. Prior art software applications for personal computers utilize metadata or information about each of the media collection items for managing and categorizing a media collection.

There are two primary means of sharing content and items amongst mobile devices in the prior art. A first primary means comprises selecting an individual item, such as a text or an image, in the mobile device's user interface, selecting the sharing means (SMS, MMS or email) and finally selecting the recipient separately before the item is forwarded to said recipient. A second primary means comprises forwarding an item, usually by email, to a sharing service, such as a weblog or moblog service, and forwarding a link, to the intended recipient, who thereafter may access the item.

At the moment however, sharing personal content on a mobile device is complicated and burdensome for a user of the mobile device in the prior art systems. Moreover, less sharing implies less receiving of personal content, and altogether a-less central role for the mobile device as a mediating center piece of personal content sharing.

SUMMARY OF THE INVENTION

An object of the present invention is to generate a delivery list of recipients based on the physical proximity of said recipients.

A further object of the present invention is to provide a system and method for enabling a strengthened sharing of personal content between mobile devices.

A particular advantage of embodiments of the present invention is a possibility to generate a delivery list based on the information on devices nearby. The transmitting device may be provided with an option of sharing personal content with devices detected in a local network such as Bluetooth or wireless local area network (WLAN), or detected in a larger network such as general mobile telecommunications network in cooperation with positioning data of devices in the mobile telecommunications network.

The term Bluetooth is in the context with a local network to be construed as if the devices are not necessarily connected. To get a Bluetooth device address the devices do not have to enter "connected" mode. E.g. a global Bluetooth inquiry is sufficient to obtain the Bluetooth device addresses.

The above objects and advantage together with numerous other objects, advantages and features, which will become evident from below detailed description, are obtained according to a first aspect of the present invention, by a method comprising:

(a) utilizing a communication network to identify one or more devices in physical proximity of a terminal;
(b) generating a list of said identified one or more devices in response to a user controlled operation of said terminal; and
(c) associating said list with said user controlled operation.

The user controlled operation according to the first aspect of the present invention may have a recording nature and provide an item. The item may comprise a text recording, an image recording, an audio recording or any combination thereof.

The method according to the first aspect of the present invention may utilize a communication network to provide a list of one or more devices in physical proximity of a terminal such as a mobile communication terminal. The method identifies the one or more devices in physical proximity of said terminal; generates a list of the identified one or more devices in response to a user controlled operation; and associates said list with said user controlled operation. The terminal may also be able to access and utilize said list.

The method according to the first aspect of the present invention may cover situations in which these steps are not done immediately. For example, (a) may be performed in the background all the time or when specific actions are done, such as when images are captured, step (b) may be performed when the specific actions are done or user explicitly decides to share something. In fact, the list may be generated without the user explicitly requesting so e.g. as part of a general routine of the terminal. Step (c) may be performed subsequently to the generation of the list and the terminal may access the list to utilize the data therein for a wide variety of purposes.

For example, the terminal may utilize the list for determining participation in guided tours, that is, a tour guide may utilize a communication network to identify one or more devices in physical proximity and use the terminal to generate a list of participants. The tour guide may further utilize the list for generating a bill for services rendered. The list may be associated with a user controlled operation i.e. the tour guide may, for example, take a picture of different groups participating in different tours during the day so that the list of participants is associated with said picture. In this way the tour guide may later send a bill to the identified participants of the different groups and possibly also the picture of the group for a souvenir. In addition to taking a picture, the tour guide may have also other kinds of possibilities to generate the list.

Obviously, the terminal may utilize the list for any number of billing and confirmation of presence environments.

Further the terminal according to the first aspect of the present invention may comprise selecting one or more recipients from said list and sharing an item, such as digital content, associated with the terminal with the one or more recipients. The terminal may perform the sharing in delayed fashion, i.e. after the selected recipients are accessible. Hence sharing may be performed at any time e.g. a week later or month later.

The communications network according to the first aspect of the present invention may comprise a Bluetooth network, a wireless local area network, a mobile telecommunications network, an inter-network such as the Internet, or any combination thereof. That is, some of the one or more devices may be connected in a Bluetooth network and other of the one or more devices may be connected in a wireless local area network. In general, the communications network may be implemented as any wideband such as ultra wideband (also known as UWB or as digital pulse wireless).

The identifying step according to the first aspect of the present invention may comprise receiving a communication network identity such as Bluetooth ID, radio frequency ID, wireless communication protocol ID, cell ID or any combination thereof, for identifying a device within physical proximity. Obviously, any positioning means may be utilized for establishing an identity. For example, it might be possible that the locations of the users are available in a presence server and when generating an image in a mobile telephone the mobile telephone may ask for nearby mobile telephones, which may be interested in a copy of the image. The query could be limited to certain other mobile telephones which have enabled their location sharing functionality. To enhance privacy, the presence server may only return a list of mobile telephones nearby, not every one's location.

The physical proximity according to the first aspect of the present invention may be defined by a transmission range within a local communications network, defined by a border at a geographical distance from the terminal, or any combination thereof.

The method according to the first aspect of the present invention may further comprise associating a communication network identity of a device with a personal identity of an associated user of said device, and associating said personal identity of said user of said device with a sharing means.

The sharing means according to the first aspect of the present invention may comprise a short messaging services message, a multimedia messaging services message, an email, or any combination thereof. Further, the sharing means may comprise a server system having a shared memory accessible by the terminal and the one or more devices. The server system may be accessible through using a protocol such as FTP protocol.

The sharing may be performed immediately after recording an item or digital content, such as a photo, and the sharing means may utilize potentially available local connectivity such as BlueTooth, WLAN or UWB. In some cases it may be unnecessary to associate network identities with mobile telephones. For example, it may be reasonable to attempt to send the item or digital content directly to each nearby Bluetooth device without having to identify the devices. Of course, in many cases it is advantageous to identify the devices so that the users of the mobile telephones do not end up sending items or digital content to undesired recipients.

The method according to the first aspect of the present invention may further comprise a step for clustering the item with any other item of the terminal according to recording time of the item and any other item. The step may further cluster the item with any other item of the terminal according to associated geographical recording position of the terminal.

The method according to the first aspect of the present invention may further comprise a step of drafting a sharing message in accordance with the sharing means. The sharing message may comprise the item or a link to a shared memory storing the item. The method may further enable a user of the terminal to configure the sharing to be automatic, if specific conditions are met. The link may be an access to weblog/moblog or the sharing device itself, which may have restricted access.

Alternatively, the user of a mobile telephone may have an easy access to the comprised list of possible recipients when selecting the recipients to receive one or more selected items. If many items are selected the list may be, for example, a union of individual delivery lists.

The above objects, advantages and features together with numerous other objects, advantages and features, which will become evident from below detailed description, are obtained according to a second aspect of the present invention by a system comprising:
(a) means for utilizing a communication network to identify one or more devices in physical proximity of said terminal;
(b) means for generating a list of said identified one or more devices in response to a user operation of said terminal; and
(c) means for associating said list with said user controlled operation.

The user controlled operation may have a recording nature and provide an item. The item may comprise a text recording, an image recording, an audio recording or any combination thereof.

The system according to the second aspect of the present invention may provide a list of one or more devices in a communication network, which one or more devices are in physical proximity of a terminal. The system may comprise means for identifying one or more devices in physical proximity of said terminal; means for generating a list of said identified one or more devices in response to a user controlled operation; and means for associating said list with said user controlled operation.

The system according to the second aspect of the present invention may further comprise sharing medium for sharing an item associated with the terminal with one or more recipients of said list.

The means for utilizing a communication network to identify one or more devices according to the second aspect of the present invention may be located in the terminal, may be located in a positioning server communicating with the terminal, or any combination thereof. Similarly, the means for generating a list may be located in the terminal, may be located in a positioning server communicating with the terminal, or any combination thereof. Further, the means for associating may be located in the terminal. These means may thus advantageously be implemented externally to the terminal or in fact be integrated in the terminal together with the processing unit.

The means for utilizing a communication network to identify one or more devices in physical proximity according to the first aspect of the present invention may be adapted to communicate a communication network identity for an identified device to the generator unit or any other means for generating a list. The communication network identity may comprise Bluetooth ID, radio frequency ID, wireless communication protocol ID, cell ID, or any combination thereof.

The means for generating a list according to the second aspect of the present invention may be adapted to receive the communication network identity for an identified device and to select for the identified device a device specific sharing medium.

The sharing medium according to the second aspect of the present invention may comprise a server system having a shared memory being accessible by the terminal and the one or more devices. In fact the terminal may act as a server itself.

The terminal according to the first aspect of the present invention may be adapted to cluster the item with any other item of the terminal according to recording time of the item and the any other item. The terminal may further be adapted to cluster the item with any other item of the terminal according to associated geographical recording position of the terminal.

The terminal according to the second aspect of the present invention may comprise a message generator adapted to draft a sharing message comprising the item or a link to the shared medium.

The terminal and the other one or more devices may each comprise a communication terminal. The term "communication terminal" should in this context be construed as a mobile or stationary communication unit such as a mobile or cellular telephone, a personal digital assistant, a computer (portable or stationary), an accessible storage facility, an accessible display facility, a digital television, or any combination thereof.

The system according to the second aspect of the present invention may incorporate any features of the method according to the first aspect of the present invention.

The above objects, advantages and features together with numerous other objects, advantages and features, which will become evident from below detailed description, are obtained according to a third aspect of the present invention by a communication terminal comprising means for utilizing a communication network to identify one or more devices in physical proximity of said terminal; means for generating a list of said identified one or more devices in response to a user operation of said terminal; and means for associating said list with said user controlled operation.

The user controlled operation may have a recording nature and provide an item. The item may comprise a text recording, an image recording, an audio recording or any combination thereof.

The communication terminal according to the first aspect of the present invention may generate a list of one or more devices connected in a communication network with and in physical proximity of said communication terminal. The communication terminal may comprise means for utilizing a communication network to identify one or more devices in physical proximity of said communication terminal, and a means for generating a list of said identified one or more devices in response to a user controlled operation, and means for associating said list with said user controlled operation.

The communication terminal according to the third aspect of the present invention may further be adapted to share the item associated with said communication terminal with any of said one or more devices in said list through said communications network.

The means for identifying one or more devices according to the third aspect of the present invention may be adapted to receive a communication network identity for an identified terminal from a positioning server and adapted to communicate the communication network identity to the means for generating a list. The means for identifying one or more devices may further be adapted to receive a communication network identity for an identified terminal from said identified terminal.

The communication terminal according to the third aspect of the present invention may incorporate any features of the method according to the first aspect and the system according to the second aspect of the present invention.

The above objects, advantages and features together with numerous other objects, advantages and features, which will become evident from below detailed description, are obtained according to a fourth aspect of the present invention by a computer program comprising code adapted to perform the method according to the first aspect of the present invention when said program is run in a system according to second aspect of the present invention or a communication terminal according to the third aspect of the present invention.

The computer program according to the fourth aspect of the present invention may incorporate any features of the method according to the first aspect, the system according to the second aspect, and the communication terminal according to the third aspect of the present invention.

The above objects, advantages and features together with numerous other objects, advantages and features, which will become evident from below detailed description, are obtained according to a fifth aspect of the present invention by a computer program product comprising code adapted to perform the method according to the first aspect of the present invention.

The computer program product according to the fifth aspect of the present invention may incorporate any features of the method according to the first aspect, the system according to the second aspect, the communication terminal according to the third aspect of the present invention, and the computer program according to the fourth aspect of the present invention.

BRIEF DESCRIPTION OF DRAWINGS

The above, as well as additional objects, features and advantages of the present invention, will be better understood through the following illustrative and non-limiting detailed description of embodiments of the present invention, with reference to the appended drawings, wherein.

DETAILED DESCRIPTION OF THE INVENTION

In the following description of the various embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Figure 1:
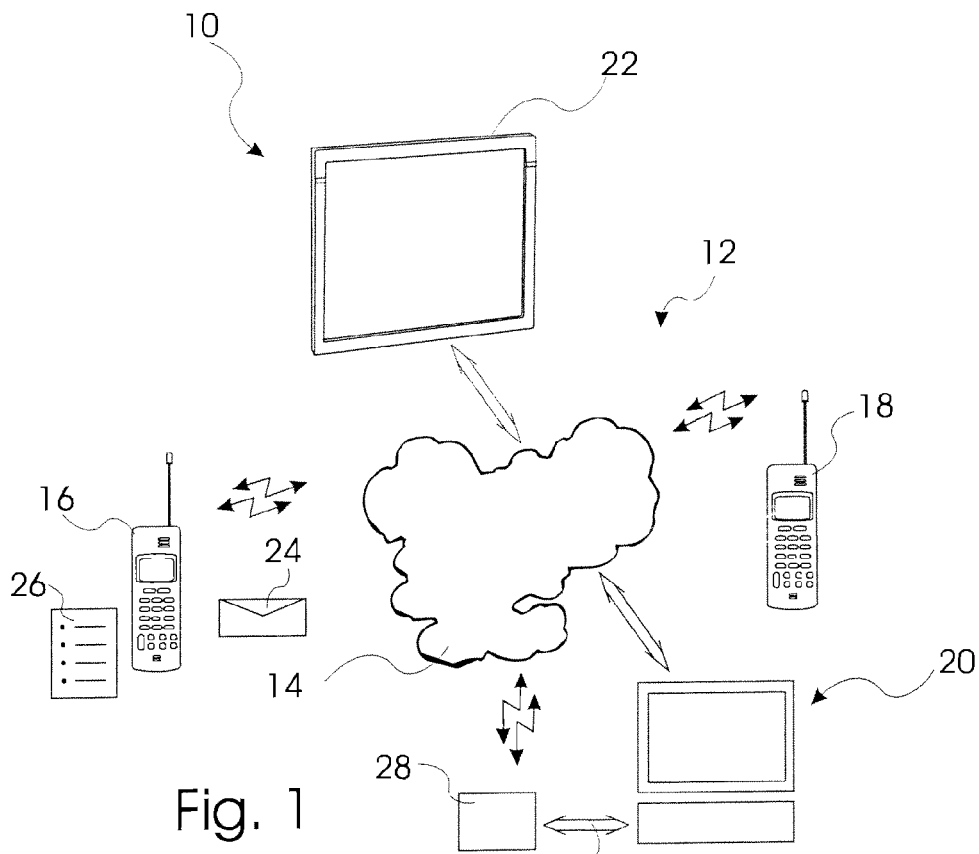
FIG. 1, shows a system according to a first embodiment of the present invention.

FIG. 1 shows a system designated in its entirety by reference numeral 10, which system 10 is for communicating personal content between a plurality of devices 12. In this context personal content is to be construed as data associated with a specific device.

The plurality of devices 12 comprises stationary and mobile devices connected to each other through a local communications network 14 such as Bluetooth, wired or wireless local area networks, wired or wireless telecommunication networks, or any combination thereof. It is, however, possible to detect devices even though they are not in the "connected" mode. For example, a global Bluetooth inquiry is enough to get the addresses of the Bluetooth devices.

The mobile devices may as shown in FIG. 1 comprise mobile telephones 16, 18 and/or a computer 20 each having a physical proximity so as to enable utilization of the local communications network 14. Obviously, the computer 20 may be a stationary or portable device.

The stationary devices may further, as shown in FIG. 1, comprise a display having physical proximity so as to enable utilization of the local communications network 14.

The mobile telephone 16 generates a delivery list 26 comprising information regarding all other devices 18, 20 and 22 connected to the local communications network 14. The delivery list 26 is generated in connection with an internal or external request. The internal request may, for example, be a photo application in the mobile telephone 16 thereby establishing a list of user of devices present when a picture is taken. The external request may, for example, be the user of the mobile telephone 16 requesting a delivery list 26 so as to establish users of other devices 18, 20, 22 in physical proximity at a given moment, the user may subsequently use the delivery list 26 to forward messages relating to any of the other devices 18, 20 and 22 relating to said given moment (e.g. a picture of an event shared at said given moment by the mobile telephone 16 and the other devices 18, 20, 22).

The user of the mobile telephone 16 utilizes the delivery list 26, for example, for billing of services rendered by the other devices 18, 20, 22 within a given period of time, such as a guided tour through a museum or a city. Alternatively, the user of the mobile telephone 16 utilizes the delivery list 26 for recapping presence of the other devices at a particular point in time.

As a further example, the mobile telephone 16 comprises personal content 24, which the user of the mobile telephone 16 wishes to share with the devices 18, 20, 22 connected to the local communications network 14. The mobile telephone 16 enables the user to share the personal content 24 to any of the devices 18, 20, 22 in the delivery list 26. The mobile telephone 16 may share the personal content 24 by forwarding a message package such as a SMS, MMS or email message to selected recipients amongst the connecting devices 18, 20, 22 in the local communications network 14. Alternatively, the mobile telephone 16 may share the personal content 24 by forwarding a link message. The link message may direct selected recipients of the connecting devices 18, 20, 22 to a sharing service possibly implemented in a sharing server 28 connecting directly to the local communications network 14 or connecting indirectly to the local communications network 14 through one of the connecting devices 16, 18, 20, 22, which in FIG. 1 is shown as connection 30.

In an alternative embodiment the sharing server 28 is implemented in the mobile telephone 16.

The system 10 thus utilizes the local communications network 14 for establishing devices in the physical proximity of the sharing device by identifying devices connected to the local communications network 14, for example, by establishing Bluetooth identities available to the sharing device.

Obviously, the other devices 18, 20, and 22 may be connected to various communication networks, which are accessible by the mobile telephone 16. The mobile telephone 16 thus utilizes its accessibility to these networks to establish the other devices 18, 20, and 22 which are in physical proximity of the mobile telephone 16. Hence the mobile telephone device 18 may be identified through a telephone communication network or a Bluetooth network, while the computer device 20 and the display device 22 may be identified through the telephone communication network and a computer network, or a Bluetooth network.

Figure 2:
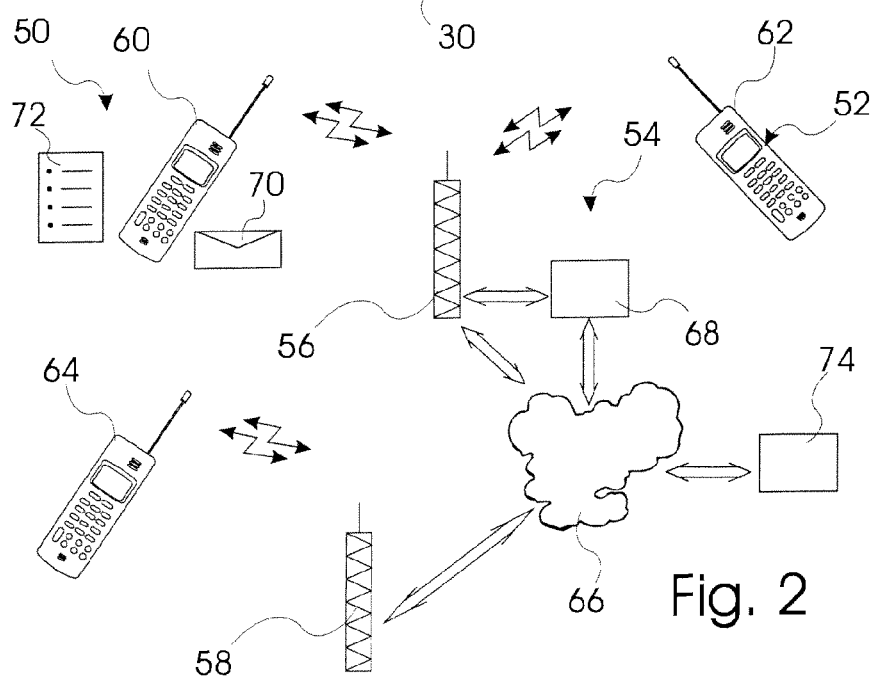
FIG. 2, shows a system according to a second embodiment of the present invention.

FIG. 2 shows a system designated in entirety by reference numeral 50, which system 50 is for communicating personal content between a plurality of devices 52.

The plurality of devices 52 are connected to a wireless telecommunications network 54 comprises antennas 56, 58 for receiving and transmitting signals between the plurality of devices 52 such as mobile telephones 60, 62, 64. Each of the antennas 56 and 58 cover a specific geographic region, shown in FIG. 2 by having mobile telephones 60 and 62 communicating via antenna 56 and mobile telephone 64 communicating via antenna 58. The antennas 56 and 58 are interconnected by a communication network 66, which may comprise wired or wireless telecommunication channels, dedicated data channels or internetworking channels (e.g. Internet channels).

The telecommunications network 54 further comprises a physical positioning service in a device positioning server 68. The positioning service may utilize various means for establishing physical position of the mobile telephones 60, 62, 64 connecting to the telecommunications network 54, for example, utilization of a global positioning system network or triangulation between antennas in the telecommunication network 66. Obviously, this technique calls for a definition of proximity, which may be defined, for example, as a range of 0-5 meters, 0-10 meters, 0-20 meters, 0-30 meters, 0-40 meters, 0-50 meters, or even larger.

As an example, the mobile telephone 60 comprises personal content 70, which the user of the mobile telephone 60 wishes to share with the mobile telephone 62 being in physical proximity of the mobile telephone 60. The mobile telephone 60 utilizes positioning service information from the device positioning server 68 to generate a delivery list 72 comprising information regarding mobile telephones in physical proximity, and the mobile telephone 60 enables the user to share the personal content 70 to any of the mobile telephones in the delivery list 72. The mobile telephone 60 may, as described above with reference to FIG. 1, share the personal content 70 by forwarding a message package such as a SMS or MMS message to selected recipients amongst the mobile telephones in the physical proximity of the mobile telephone 60. Alternatively, the mobile telephone 60 may share the personal content 70 by forwarding a link message directing mobile telephones to a sharing service possibly implemented in a sharing server 74 connecting to the communications network 66.

The system 50 thus utilizes the device positioning server 68 for establishing devices in the physical proximity of the sharing device, for example, by a global positioning system or by triangulation between antennas.

Figure 3:
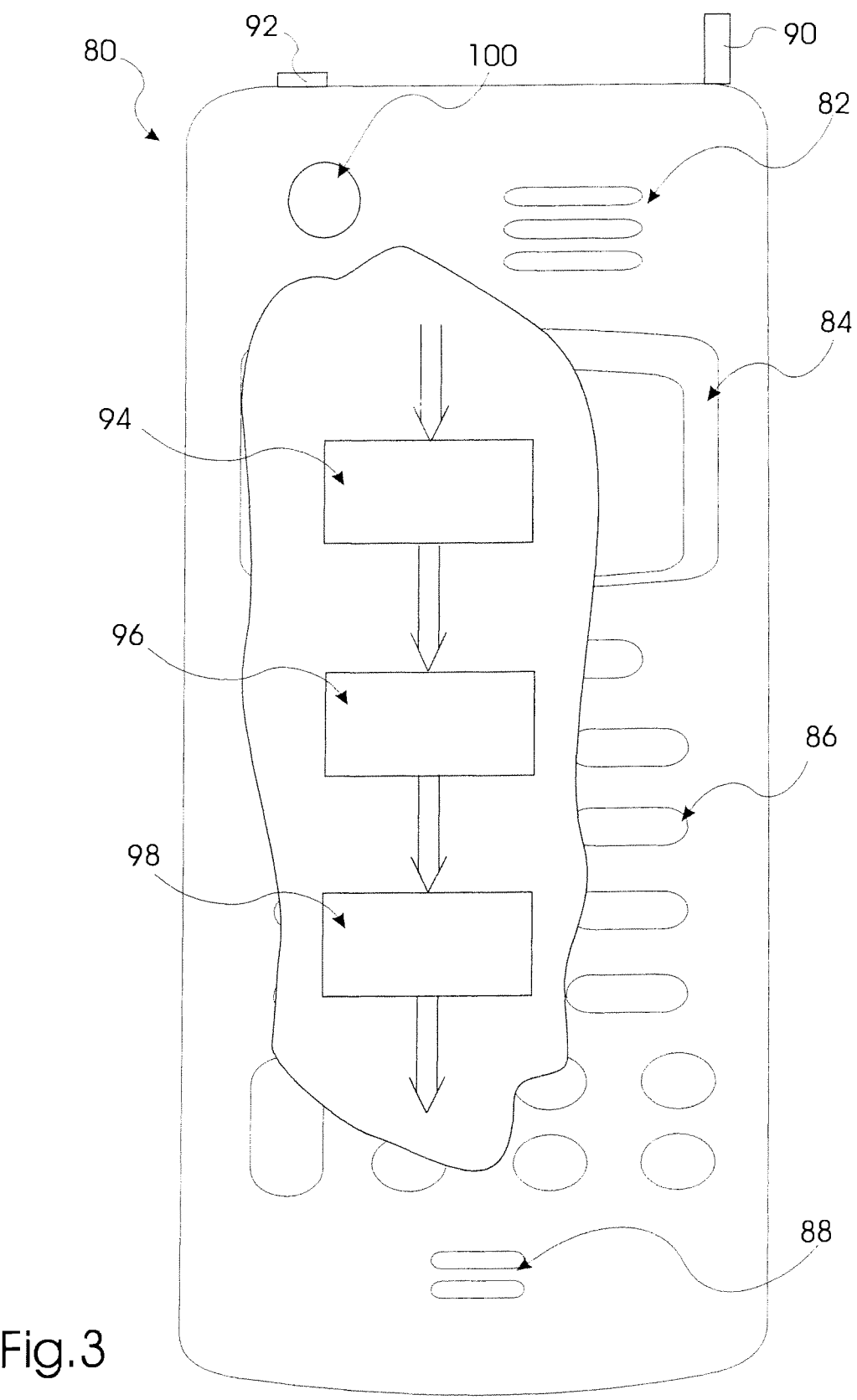
FIG. 3, shows a mobile device according to a third embodiment of the present invention.

FIG. 3 shows a mobile telephone designated in entirety by reference numeral 80. The mobile telephone 80 comprises a loudspeaker 82, a display 84, a keypad 86, and a microphone 88 for enabling the user of the mobile telephone 80 to generate outgoing messages as well as to read incoming messages. The mobile telephone 80 communicates with other devices via antenna 90 through a wireless communications network, as described with reference to FIG. 2, or via antenna 92 through a local communications network as described with reference to FIG. 1.

The mobile telephone 80 further comprises an identifying unit 94 adapted to identify devices in physical proximity of the mobile telephone 80 from positioning service information from a device positioning server via the antenna 90 and/or from response data from a local communications network via the antenna 92. The devices in physical proximity of the mobile telephone 80 may be based on Bluetooth ID, radio frequency ID (RFID), WLAN ID, positioning services, cell ID, a presence server or any other means available. The identifying unit 94 may configure the positioning service information or the response data according to any desired request. For example, the identifying unit 94 may utilize a local phonebook on the mobile telephone 80 as a delimiter on the positioning service information or the response data so as to narrow the number of possible device identities. It is also possible that the user has, for privacy reasons, a possibility to enable and disable the location sharing functionality. The identifying unit 94 performs identification concurrently or in real-time with the generation of personal content item such as an image or an audio data section.

The mobile telephone 80 further comprises a delivery list generator 96 for presenting the user of the mobile telephone 80 with possible recipients (i.e. devices) in physical proximity of the mobile telephone 80.

Finally, the mobile telephone 80 further comprises a sharing list generator 98 for recording the user's selections and enable sharing of personal content with selected recipients.

When the mobile telephone 80 records a text, sound, image or any combination thereof as personal content, the mobile telephone 80 may desire to share this personal content with devices in the vicinity, since it is possible that devices in the proximity may somehow be related to the personal content or at least interested in receiving it as their personal content, e.g. the mobile telephone 80 generates an image through a camera 100, in which image users of mobile telephones in the proximity are present and therefore would appreciate a copy of the image. The identifying unit 94 identifies the mobile telephones in the proximity, the list generator 96 generates a delivery list of the possible recipients in the proximity and the user selects any recipients and the sharing list generator 98 records the selected recipients and shares the personal content with the selected recipients.

The mobile telephone 80 may store a recorded specific personal content item together with associated information regarding devices in the physical proximity. This provides the user of the mobile telephone 80 to generate personal content items and subsequently forward any of the items at a later stage.

Figure 4:
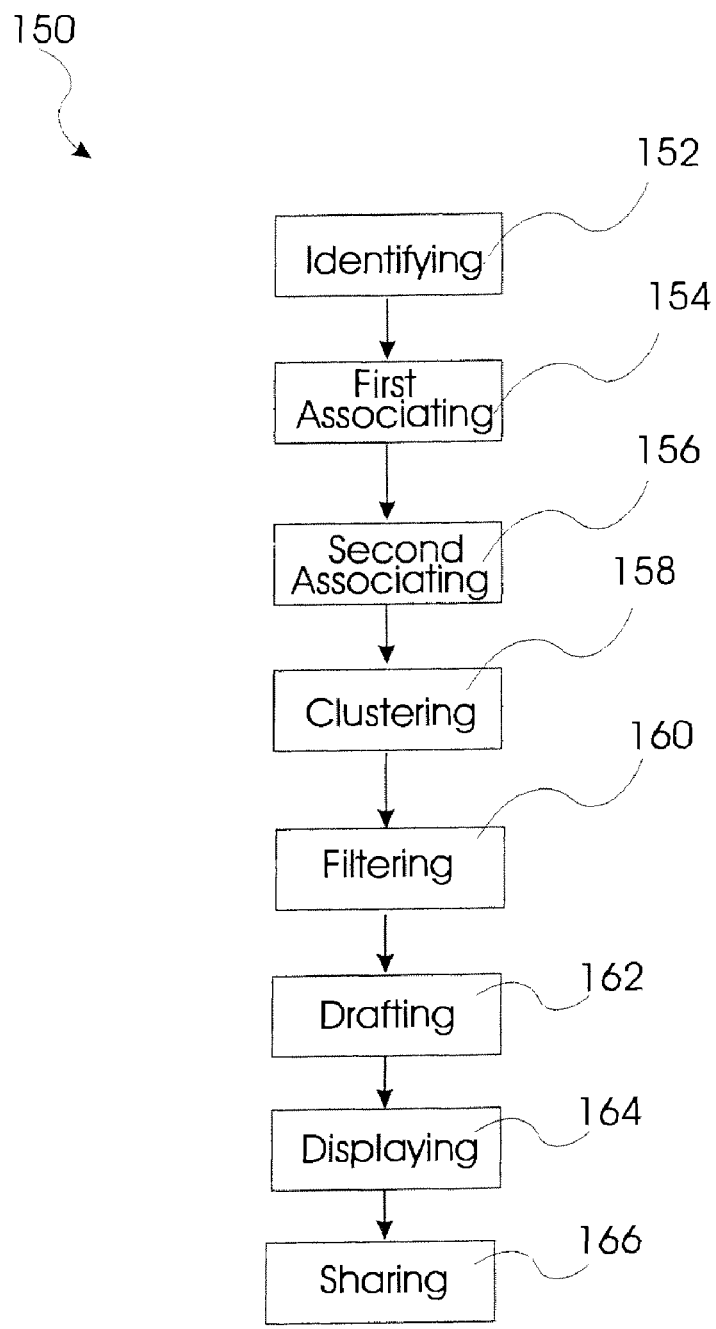
FIG. 4, shows a flow chart of a method computer program, and computer program product according to a fourth embodiment of the present invention.

FIG. 4 shows a method designated in entirety by reference numeral 150, which method 150 enables a sharing device to share personal content with a plurality of devices in physical proximity with the sharing device.

The method 150, which may be implemented in a sharing device as a personal content manager application, comprises an identifying step 152 during which the method 150 performs an identification of devices in physical proximity with the sharing device, for example, a mobile telephone, a personal digital assistant or a computer, simultaneously or concurrently with the recording of a personal content item such as a photo, soundtrack or any other multimedia data.

The method 150 further comprises a first associating step 154 during which the method 150 performs an association between identified devices in physical proximity, that is a device ID, and personal identity of the users of said identified devices. Advantageously, this may be achieved by utilizing an address book in the sharing device.

The method 150 further comprises a second associating step 156 during which the method 150 performs a further association between personal identity of the users of said identified devices with sharing means. That is, which type of sharing means a particular personal identity may require such as mobile telephone number for forwarding SMS or MMS or IP-address for forwarding email.

The first and second associating step 154 and 156 enable the sharing device to know who the nearby persons are and what are their requirements for accessing shared personal content.

The method 150 performs periodically, for example, by the personal content manager application in the sharing device, the identifying step 152, the first and second associating steps 154 and 156. These steps 152, 154 and 156 may comprise compatibility between Internet based media objects and mobile telecommunications network based media objects (e.g. MMS) so that the personal content items themselves comprise metadata rendering the detection of sharing means automatic. Thus there is no requirement for the user of the sharing device to manually add "sharing means" entries to the address book.

The method 150 further comprises a clustering step 158 to be performed periodically by, for example, the personal content manager application in the sharing device, during which the method 150 clusters the personal content items according to time and/or geographical position. Hereby the sharing device quickly may identify further possible recipients not necessarily present during generation of one item such as a photo, but present at a later time during which a second item was generated.

The method 150 further comprises a filtering step 160 to be performed periodically by, for example, the personal content manager application in the sharing device, during which the method 150 filters based on any user or application determined schedule. That is, the method 150 may filter the identified devices according to a favorite list of recipients. This capability is of high value when the user of the sharing device generates a plurality of personal content items such as photos and/or soundtracks.

The method 150 further comprises a drafting step 162 during which the method 150 drafts a personal content sharing message or messages. This draft is displayed to the user of the sharing device during a displaying step 164, which may be utilized by any appropriate application such as the personal content manager application or, in fact, a messaging application or email application. The drafted personal content sharing message or messages are shared to selected devices during a final sharing step 166. The devices do not necessarily have to be close to the sharing device during sharing. For example, a birthday party may be at place A, a user of the sharing device drafts the sharing messages at place B and sends an item to the other participants of the birthday party. Hence the list may be generated and stored at any point in time and later be utilized for any user operations such as sharing of digital content.

During the final sharing step 166, the method 150 enables the user of the sharing device to modify the drafted personal content sharing message or messages or to configure the sharing to be automatic, for example, if specific conditions are met such as personal content is shared with a possibly restricted access "home" weblog/moblog. Thus in many situations the user of the sharing device may share personal content item by performing a single click operation.

It should be understood that the sharing device may utilize a first communication network for identifying the plurality of devices in physical proximity of the sharing device and a second communication network for sharing the personal content. For example, the first communication network may be a mobile telecommunication network and the second communication network may be Bluetooth.

The method 150 may, as described above, be implemented as a personal content manager application established in hard- or software. Hence a computer program performing said method 150 when run on a sharing device is part of the present invention.

What is claimed is:

1. A method comprising:
   (a) causing a first communication network to be utilized to identify a presence of one or more devices in physical proximity of a terminal;
   (b) generating a list of said identified one or more devices in response to a user controlled operation of said terminal;
   (c) associating said list with said user controlled operation; and
   (d) causing a service to be provided based on the list of the identified one or more devices, wherein causing the service to be provided further comprises causing billing of services rendered to be provided based on the presence of the identified one or more devices at a particular point in time.

2. The method of claim 1, wherein said first communication network comprises a Bluetooth network, wireless local area network, a mobile telecommunication network, an inter-network such as the Internet, or any combination thereof.

3. The method of claim 1, wherein said physical proximity is defined by a transmission range within said first communications network, by a border at a geographical distance from said terminal, or by any combination thereof.

4. The method of claim 1, wherein said identifying one or more devices comprises receiving a communication network identity for a device in physical proximity of said terminal and further comprising associating said communication network identity of said device with a personal identity of a user of said device and further comprising associating said personal identity with a sharing technique, wherein said sharing technique comprises a short messaging services message, a multimedia messaging services message, an email, a server system having a shared memory accessible by said terminal and said one or more devices or any combination thereof.

5. The method of claim 1, wherein causing a service to be provided further comprises recapping the presence of the identified one or more devices at a given particular point in time.

6. A method comprising:
   (a) causing a first communication network to be utilized to identify one or more devices in physical proximity of a terminal;
   (b) generating a list of said identified one or more devices in response to a user controlled operation of said terminal;
   (c) associating said list with said user controlled operation;
   (d) receiving a selection of one or more recipients from said list; and
   (e) causing an item to be shared with said one or more recipients, wherein said sharing involves distribution on a second communication network, and wherein said item comprises a text recording, an image recording, an audio recording, or any combination thereof.

7. The method of claim 6, wherein said the first and second communication networks comprise a Bluetooth network, wireless local area network, a mobile telecommunication network, an inter-network such as the Internet, or any combination thereof.

8. The method of claim 6, wherein said identifying one or more devices comprises receiving a communication network identity for a device in physical proximity of said terminal and wherein said communication network identity comprises a Bluetooth ID, a radio frequency ID, a wireless communication protocol ID, a cell ID, or any combination thereof.

9. The method of claim 6, wherein said identifying one or more devices comprises receiving a communication network identity for a device in physical proximity of said terminal and further comprising associating said communication network identity of said device with a personal identity of a user of said device.

10. The method of claim 9, further comprising associating said personal identity with a sharing technique.

11. The method of claim 10, wherein said sharing technique comprises a short messaging services message, a multimedia messaging services message, an email, a server system having a shared memory accessible by said terminal and said one or more devices or any combination thereof.

12. The method of claim 6, wherein said physical proximity is defined by a transmission range within said first communications network, by a border at a geographical distance from said terminal, or by any combination thereof.

13. The method of claim 6, further comprising clustering said item with any other item of said terminal according to a recording time of said item and a recording time of said any other item.

14. The method of claim 13, wherein said clustering further comprises clustering said item with said any other item of said terminal according to associated geographic recording position of said terminal.

15. The method of claim 6, further comprising drafting a sharing message comprising said item or a link to a shared memory storing said item.

16. The method of claim 15, wherein drafting the sharing message includes drafting the sharing message automatically in an instance in which specific conditions are met.

17. The method of claim 16, wherein one specific condition is that personal content is shared with a restricted access home weblog/moblog.

18. A non-transitory memory device having a computer program stored thereon, the computer program, when executed, being configured to direct an apparatus to at least:
   cause a first communication network to be utilized to identify a presence of one or more devices in physical proximity of a terminal;
   generate a list of said identified one or more devices in response to a user controlled operation of said terminal;
   associate said list with said user controlled operation; and
   cause a service to be provided based on the list of the identified one or more devices, wherein being configured to direct the apparatus to cause the service to be provided includes being configured to direct the apparatus to cause billing of services rendered to be provided based on the presence of the identified one or more devices at a particular point in time.

19. A non-transitory memory device having a computer program stored thereon, the computer program, when executed, being configured to direct an apparatus to at least:
   cause a first communication network to be utilized to identify one or more devices in physical proximity of a terminal;
   generate a list of said identified one or more devices in response to a user controlled operation of said terminal;
   associate said list with said user controlled operation;
   receive a selection of one or more recipients from said list; and
   cause an item to be shared with said one or more recipients, wherein said sharing involves distribution on a second communication network, and wherein said item comprises a text recording, an image recording, an audio recording, or any combination thereof.

20. The non-transitory memory device of claim 19, wherein the computer program is further configured to direct the apparatus to draft a sharing message comprising said item or a link to a shared memory storing said item, wherein being configured direct the apparatus to draft said sharing message includes being configured to direct the apparatus to draft said sharing message automatically in an instance in which specific conditions are met.

21. The non-transitory memory device of claim 20, wherein one specific condition is that personal content is shared with a restricted access home weblog/moblog.

22. An apparatus comprising circuitry and a memory device having a computer program code stored thereon, the memory device and the computer program configured to with the circuitry, direct the apparatus at least to:

cause a first communication network to be utilized to identify a presence of one or more devices in physical proximity of said communication terminal;

generate a list of said identified one or more devices in response to a user controlled operation of said communication terminal;

associate said list with said user controlled operation; and cause a service to be provided based on the list of the identified one or more devices, wherein being directed to cause the service to be provided includes being directed to cause billing of services rendered to be provided based on the presence of the identified one or more devices at a particular point in time.

23. The apparatus of claim 22, wherein being directed to cause the first communication network to be utilized further comprises being directed to use physical position information received from a physical positioning service in said first communication network, wherein a local phonebook is used to narrow a number of identities provided in the physical positioning information.

24. The apparatus of claim 22, wherein being directed to generate the list includes being directed to generate the list via a delivery list generator.

25. An apparatus comprising circuitry and a memory device having a computer program code stored thereon, the memory device and the computer program configured to, with the circuitry, direct the apparatus at least to:

cause a first communication network to be utilized to identify one or more devices in physical proximity of a terminal;

generate a list of said identified one or more devices in response to a user controlled operation of said terminal;

associate said list with said user controlled operation;

receive a selection of one or more recipients from said list; and cause an item to be shared with said one or more recipients, wherein said sharing involves distribution on a second communication network, and wherein said item comprises a text recording, an image recording, an audio recording, or any combination thereof.

26. The apparatus of claim 25, wherein being directed to cause the first communication network to be utilized further comprises being directed to use physical position information received from a physical positioning service in said first communication network.

27. The apparatus of claim 25, wherein being directed to generate the list includes being directed to generate the list via a delivery list generator.

28. The apparatus of claim 25, wherein being directed to cause an item to be shared includes being directed to cause an item to be shared via a sharing list generator.

29. The apparatus of claim 25, wherein the apparatus is configured to use the first communication network to identify and the second communication network to distribute.

30. The apparatus of claim 25, wherein the apparatus is further directed to draft a sharing message comprising said item or a link to a shared memory storing said item.

31. The apparatus of claim 30, wherein being directed to draft the sharing message includes being directed to draft the sharing message automatically in an instance in which specific conditions are met.

32. The apparatus of claim 31, wherein one specific condition is that personal content is shared with a restricted access home weblog/moblog.

* * * * *